April 19, 1966 R. J. BISSO ETAL 3,247,413
ULTRA-VIOLET RADIATION SENSING DEVICE
Filed Dec. 9, 1963

INVENTORS
Robert J. Bisso &
H. William Herbert
BY
Robert E. Strausser
ATTORNEY

United States Patent Office

3,247,413
Patented Apr. 19, 1966

---

3,247,413
ULTRA-VIOLET RADIATION SENSING DEVICE
Robert J. Bisso and Harold William Herbert, Emporium, Pa., assignors to Sylvania Electric Products Inc., a corporation of Delaware
Filed Dec. 9, 1963, Ser. No. 329,152
7 Claims. (Cl. 313—101)

This invention relates generally to radiation sensing devices and more particularly to devices for sensing and measuring incremental changes in ultraviolet radiation.

There are at present many devices available for detecting changes in various wavelengths of radiation. This is true particularly of the radiation which comprises the "optical spectrum," i.e., the infrared, visible, and ultraviolet area of the electromagnetic spectrum which is contained in ordinary light. The common photocell is an example of one such device. This is a relatively inexpensive device employing a photosensitive material that varies its resistance in accordance with the amount of visible radiation falling on it. While useful in many applications, it is relatively insensitive to ultraviolet radiation.

Devices are available for detecting ultraviolet radiation but they have inherent disadvantages that preclude their use in all but very special applications.

Two of these devices are the photomultiplier tube and the UV sensitive phototube. These tubes have in common the disadvantages of requiring high anode potentials for operation, i.e., 700 to 1,500 volts, together with a high cost of manufacture which eliminates them from consideration in many nonindustrial applications.

In addition, the UV sensitive phototube is an avalanche-type device. That is, it cannot record incremental changes in radiation except at threshold, and the photomultiplier tube has a lack of sensitivity which requires amplification of initial radiation.

It is, therefore, an object of this invention to provide a sensing device that does not need high potentials for operation.

It is another object of this invention to provide a sensing device that does not require intermediate amplification.

Still another object of this invention is to provide a sensing device that is relatively inexpensive to produce.

These and other objects are achieved in one aspect of the invention by providing a device for sensing incremental changes in the amount of radiation of a first wave length comprising an opaque, substantially cup-shaped base member having a photocell positioned therein. The photocell has within it a photosensitive material that is responsive to a second wave length of radiation. A filter which will transmit radiation of the first wave length is used to seal the open end of the base member. A phosphor layer is positioned intermediate the filter and the photocell, the phosphor emitting radiation of said second wave length when impinged by radiation of said first wave length.

This device provides many improvements over those of the prior art. As it is a resistance device, changes in the amount of radiation falling thereon are manifested by corresponding changes in its resistance. Since these changes are independent of the potential applied to the device, it will be seen that any available voltage may be utilized and high potentials are not needed. No intermediate amplification is needed, and it is relatively inexpensive to produce.

For a better understanding of the present invention, together with other and further objects, advantages, and capabilities thereof, reference is made to the following disclosure and appended claims in connection with the accompanying drawings in which:

Figure 1:
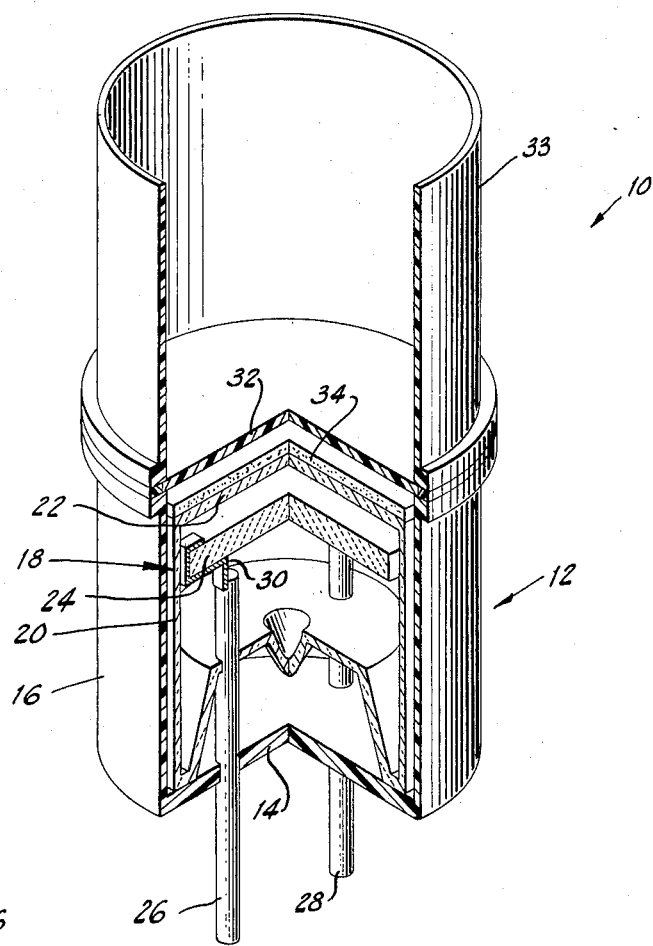
FIG. 1 is a perspective view of the device partially in section.

Referring now to the drawings with greater particularity, in FIG. 1 is shown a sensing device 10 having a substantially cup-shaped base member 12 formed from an electrically insulating material such as plastic or ceramic. Base member 12 is opaque and has a bottom 14 and a contiguous upstanding wall 16.

A photocell 18 is positioned within base member 12 and is comprised of an encapsulating envelope 20 having an upper surface 22 which is transparent to at least visible radiation. A photosensitive material 24 is mounted within envelope 20 and is positioned adjacent upper surface 22. Photosensitive material 24 is responsive to at least visible radiation but is relatively nonresponsive to ultraviolet. That is, its resistance will vary with the amount of visible radiation falling on it.

A pair of electrically conductive leads 26, 28 are connected to photosensitive material 24 by means of tabs 30 (only one of which is shown), to provide electrical connection therewith and also to support photosensitive material 24 adjacent upper surface 22. The leads 26, 28 terminate outside envelope 20 and are sufficiently long to project exteriorly of base member 12.

An ultraviolet transmitting, visible radiation absorbing filter 32 is cemented or otherwise affixed to the open end of base member 12 thereby sealing the interior of member 12 from all external visible radiation. A hollow, substantially cylindrical ambient light shield 33 may also be provided when it is desirable to sense radiation from a point source only and may be cemented or otherwise affixed to the device.

Intermediate the filter 32 and upper surface 22 is a layer of phosphor 34 which may conveniently be applied to the top of upper surface 22 by any conventional means, such as spraying. Phosphor 34 will emit radiation in the visible range of the spectrum when it is impinged by ultraviolet radiation; and preferably, it should have a rapid decay time.

Specifically, such a sensing device might utilize a conventional photocell employing cadmium sulfide (CdS), as the photosensitive material. The CdS is relatively nonresponsive to radiation in the ultraviolet region; however, it is responsive to incremental changes in visible radiation, particularly radiation having a wavelength between 5,000 A. and 6,000 A.

A typical phosphor that might be used is that known as P1. This is a zinc orthosilicate phosphor activated with manganese ($Zn_2SiO_4$:Mn), and it has peak emission, when excited, in the 5,600 A. range of the visible spectrum.

This phosphor emits visible radiation when impinged by ultraviolet radiation having a wavelength of the order of 2,537 A., and the amount of emitted radiation varies directly with the amount of UV impinging thereon.

By providing a filter 32 that will transmit UV radiation of 2,537 A. wavelength, this device will exhibit a 600 to 1 change in resistance between the zero UV and 3 microwatts/cm.$^2$ illumination states. Therefore, it will sense incremental changes in incident UV which are less than 3 microwatts/cm.$^2$ in magnitude. This is approximately equal to a visible light change of 2-foot candles. As normal office illumination is usually about 50–60 foot candles, it will be seen that the device is capable of sensing relatively small changes in the amount of incident ultraviolet radiation.

Figure 2:
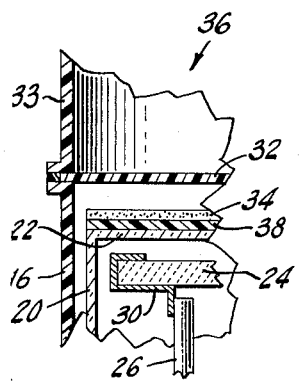
FIG. 2 is a partial, sectional, elevational view of an alternate embodiment.

The sensing device described above does, however, have limitations not readily apparent. These limitations arise first from the fact that any filter that will transmit UV radiation will also transmit small quantities of infrared radiation, and secondly from the fact that CdS photocells are responsive to infrared radiation as well as to visible radiation. To be accurate, therefore, the sensing device 10 should be employed under conditions where adulterating infrared radiation is not present.

Where it is desirable to sense incremental changes in UV and adulterating amounts of infrared do exist, the alternate embodiment of the invention disclosed in FIG. 2 may be employed.

In this instance, a sensing device 36 is shown as having a second filter 38 which is positioned intermediate the phosphor 34 and upper surface 22. Filter 38 will absorb infrared while transmitting visible radiation.

Assuming now that the device is being used in a situation where the incident radiation falling thereon is composed of ordinary light, i.e., ultraviolet, visible, and infrared radiation, it will be seen that the first filter 32 will absorb all the visible radiation while transmitting the ultraviolet and the infrared.

The ultraviolet will be absorbed into the phosphor layer 34 thereby causing it to emit visible radiation while the infrared passes through the phosphor to be absorbed by the second filter 38. The visible radiation being emitted from phosphor 34 is transmitted by filter 38 and by upper surface 22 so that it impinges upon photosensitive material 24 thereby lowering its resistance.

There is thus provided by this invention a device that is capable of sensing incremental changes in the amount of incident ultraviolet radiation that has none of the disadvantages of the prior art. It does not need the high potentials used heretofore because it is a variable resistance device that is not dependent upon the voltage applied to the cell. It is sensitive to incremental changes in ultraviolet radiation over a wide range instead of only at threshold as is true of avalanche-type devices, and it is relatively inexpensive to manufacture.

While there have been shown and described what are at present considered the preferred embodiments of the invention, it will be obvious to those skilled in the art that various changes and modifications may be made therein without departing from the invention as defined by the appended claims.

What is claimed is:

1. A device for sensing incremental changes in the amount of incident spectral radiation of a first wavelength falling thereon comprising: an opaque, substantially cup-shaped base member having a bottom and a contiguous upstanding wall; a photocell comprising an encapsulating envelope having an upper surface transparent to radiation of a second wavelength, a photosensitive material responsive to radiation of said second wavelength mounted within said envelope adjacent said upper surface, and a pair of electrically conductive leads connected to said photosensitive material each terminating outside said envelope; said photocell being positioned within said cup-shaped base member with said leads projecting exteriorly of said base member; a filter transmitting radiation of said first wavelength sealing the open end of said base member, and a layer of phosphor positioned intermediate said filter and said upper surface of said photocell, said phosphor emitting radiation of said second wavelength when impinged by radiation of said first wavelength.

2. A device for sensing incremental changes in the amount of incident spectral radiation of a first wavelength falling thereon comprising: an opaque, substantially cup-shaped base member having a bottom and a contiguous upstanding wall; a photocell comprising an encapsulating envelope having an upper surface transparent to radiation of a second wavelength, a photosensitive material responsive to radiation of said second wavelength mounted within said envelope adjacent said upper surface, and a pair of electrically conductive leads connected to said photosensitive material each terminating outside said envelope; said photocell being positioned within said cup-shaped base member with said leads projecting exteriorly of said base member; a filter transmitting radiation of said first wavelength sealing the open end of said base member, a layer of phosphor positioned intermediate said filter and said upper surface of said photocell; said phosphor emitting radiation of said second wavelength when impinged by radiation of said first wavelength; and a hollow, substantially cylindrical ambient radiation shield mounted on said filter.

3. A device for sensing incremental changes in the amount of incident, normally invisible radiation falling thereon comprising: an opaque, substantially cup-shaped base member having a bottom and a contiguous upstanding wall; a photocell comprising an encapsulating envelope having an upper surface transparent to visible radiation, a photosensitive material responsive to said visible radiation mounted within said envelope adjacent said upper surface, and a pair of electrically conductive leads connected to said photosensitive material each terminating outside said envelope; said photocell being positioned within said cup-shaped base member with said leads projecting exteriorly of said base member; a filter transmitting invisible radiation sealing the open end of said base member, and a layer of phosphor positioned intermediate said filter and said upper surface of said photocell, said phosphor emitting visible radiation when impinged by invisible radiation.

4. A device for sensing incremental changes in the amount of incident ultraviolet radiation falling thereon comprising: an opaque, substantially cup-shaped base member having a bottom and a continous upstanding wall; a photocell comprising an encapsulating envelope having an upper surface transparent to visible radiation, a photosensitive material responsive to said visible radiation mounted within said envelope adjacent said upper surface, and a pair of electrically conductive leads connected to said photosensitive material each terminating outside said envelope; said photocell being positioned within said cup-shaped base member with said leads projecting exteriorly of said base member, a filter transmitting ultraviolet radiation sealing the open end of said base member, and a layer of phosphor positioned intermediate said filter and said upper surface of said photocell, said phosphor emitting visible radiation when impinged by ultraviolet radiation.

5. A device for sensing incremental changes in the amount of incident spectral radiation of a first wavelength falling thereon comprising: an opaque, substantially cup-shaped base member having a bottom and a contiguous upstanding wall; a photocell comprising an encapsulating envelope having an upper surface transparent to radiation of a second wavelength and a third wavelength, a photosensitive material responsive to radiation of said second wavelength and said third wavelength mounted within said envelope adjacent said upper surface, and a pair of electrically conductive leads connected to said photosensitive material each terminating outside said envelope; said photocell being positioned within said cup-shaped base member with said leads projecting exteriorly of said base member; a first filter transmitting radiation of said first wavelength and said third wavelength sealing the open end of said base member, a layer of phosphor positioned intermediate said first filter and said upper surface of said photocell, said phosphor emitting radiation of said second wavelength while transmitting radiation of said third wavelength, and a second filter intermediate said phosphor and said upper surface of said photocell, said second filter absorbing radiation of said third wavelength while transmitting radiation of said second wavelength.

6. A device for sensing incremental changes in the amount of incident ultraviolet radiation falling thereon where said ultraviolet radiation is adulterated with infrared radiation comprising: an opaque, substantially cup-shaped base member having a bottom and a contiguous upstanding wall; a photocell comprising an encapsulating envelope having an upper surface transparent to infrared and visible radiation, a photosensitive material responsive to said infrared and said visible radiation mounted within said envelope adjacent sad upper surface and a pair of electrically conductive leads connected to said photosensitive material each terminating outside said envelope; said photocell being positioned within said cup-shaped base member with said leads projecting exteriorly of said base member; a first filter transmitting said ultraviolet and said infrared radiation sealing the open end of said base member, a layer of phosphor positioned intermediate said first filter and said upper surface of said photocell, said phosphor emitting visible radiation when impinged by said ultraviolet radiation while transmitting said infrared radiation, and a second filter intermediate said phosphor and said upper surface of said photocell, said second filter absorbing said infrared radiation while transmitting said visible radiation.

7. A device for sensing incremental changes in the amount of incident ultraviolet radiation falling thereon where said ultraviolet radiation is adulterated with infrared radiation comprising: an opaque, substantially cup-shaped base member having a bottom and a contiguous upstanding wall; a photocell comprising an encapsulating envelope having an upper surface transparent to infrared and visible radiation, a photosensitive material responsive to said infrared and said visible radiation mounted within said envelope adjacent said upper surface, and a pair of electrically conductive leads connected to said photosensitive material each terminating outside said envelope; said photocell being positioned within said cup-shaped base member with said leads projecting exteriorly of said base member; a first filter transmitting said ultraviolet and said infrared radiation sealing the open end of said base member, a layer of phosphor positioned intermediate said first filter and said upper surface of said photocell, said phosphor emitting visible radiation when impinged by said ultraviolet radiation while transmitting said infrared radiation, and a second filter intermediate said phosphor and said upper surface of said photocell, said second filter absorbing said infrared radiation while transmitting said visible radiation and a hollow, substantially cylindrical ambient radiation shield mounted on said filter.

No references cited.

GEORGE N. WESTBY, *Primary Examiner.*

R. SEGAL, *Assistant Examiner.*